US007644322B2

(12) United States Patent
Dye

(10) Patent No.: US 7,644,322 B2
(45) Date of Patent: Jan. 5, 2010

(54) HARDWARE FLOW CONTROL MONITOR

(75) Inventor: Albert Dye, Coatbridge (GB)

(73) Assignee: ATMEL Corporation, San Jose, CA (US)

( * ) Notice: Subject to any disclaimer, the term of this patent is extended or adjusted under 35 U.S.C. 154(b) by 429 days.

(21) Appl. No.: 11/562,280

(22) Filed: Nov. 21, 2006

(65) Prior Publication Data

US 2008/0120492 A1    May 22, 2008

(51) Int. Cl.
G06F 11/00    (2006.01)
(52) U.S. Cl. .......................................... 714/50; 714/51
(58) Field of Classification Search .................. 714/39, 714/49, 50, 51; 717/131
See application file for complete search history.

(56) References Cited

U.S. PATENT DOCUMENTS

| 4,108,359 | A | * | 8/1978 | Proto .......................... 714/732 |
| 4,184,201 | A |   | 1/1980 | Melberg et al. |
| 5,473,754 | A |   | 12/1995 | Folwell et al. |
| 5,515,540 | A |   | 5/1996 | Grider et al. |
| 5,974,529 | A | * | 10/1999 | Zumkehr et al. .............. 712/41 |
| 6,044,458 | A | * | 3/2000 | Rinkenberger et al. ...... 712/227 |
| 6,212,134 | B1 | * | 4/2001 | Yamashita ................... 368/10 |
| 6,272,637 | B1 |   | 8/2001 | Little et al. |
| 6,543,012 | B1 | * | 4/2003 | Viswanathan et al. ......... 714/50 |
| 6,615,324 | B1 | * | 9/2003 | Fernald ....................... 711/153 |
| 2003/0065929 | A1 |   | 4/2003 | Milliken |
| 2005/0028004 | A1 |   | 2/2005 | Dellow et al. |
| 2005/0257016 | A1 | * | 11/2005 | Boles et al. .................. 711/163 |
| 2007/0168761 | A1 | * | 7/2007 | Baltes et al. ................... 714/51 |
| 2007/0255980 | A1 | * | 11/2007 | Endo et al. .................... 714/51 |

FOREIGN PATENT DOCUMENTS

FR    2790844    9/2000

OTHER PUBLICATIONS

International Search Report and Written Opinion in PCT/US2007/084861, mailed Jul. 17, 2008, 81 pages.
"Embedded System Security, Designing Secure Systems With Windows CE," White Paper, Applied Data Systems, 33 pages.

* cited by examiner

Primary Examiner—Marc Duncan
(74) Attorney, Agent, or Firm—Fish & Richardson P.C.

(57) ABSTRACT

Systems for detecting unexpected program flow may include a hardware program flow monitor to generate an interrupt signal if a software program flow value does not match an incrementally updated hardware value when a processor executes a program flow check instruction. In some examples, a program of instructions may include a number of program flow check instructions. When a program flow check instruction is executed, the processor may send the software value to be compared to the hardware register value. In an illustrative example, program execution causes the hardware value to be incremented in a hardware register. Upon execution of a program flow check instruction, the hardware value is compared to a software value associated with the program flow check instruction to determine if the program instructions have been executed in an expected sequence (e.g., according to an expected program flow).

13 Claims, 4 Drawing Sheets

US 7,644,322 B2

HARDWARE FLOW CONTROL MONITOR

TECHNICAL FIELD

Various implementations relate to execution of a program of instructions.

BACKGROUND

Many electronic devices use data processors, such as microprocessors or microcontrollers, to perform operations according to a programmed set of instructions. Processors can be implemented as integrated circuits in plastic or ceramic packages. Within the processor package, a large number of transistors may be arranged to form, for example, a central processing unit (CPU) for a computer.

Some processor architectures include, among other things, a control unit, a memory interface, and an interrupt controller. In some conventional processors, the control unit fetches, decodes, and executes a series of instructions. Upon decoding an individual instruction, the control unit may apply appropriate signals to an arithmetic logic unit (ALU) or to other components.

The control unit can fetch instructions through the memory interface. The memory interface may provide appropriate address, control, and data signals to access and read instructions stored in a memory device, such as a disk drive, random access memory (RAM), or read only memory (ROM). A typical memory interface may supply a series of instructions to be sequentially executed by the control unit. The order in which the instructions are executed by the control unit may be referred to generally as the program flow.

The interrupt controller can interrupt the program flow to respond to an external (e.g., external to the processor package) signal. For example, the interrupt controller may respond to an external signal by temporarily interrupting the control unit's program flow, and causing the control unit to execute a pre-defined set of instructions, which is typically referred to as an interrupt routine. After completing the interrupt routine, the control unit typically resumes the original program flow.

SUMMARY

Systems for detecting program flow disruptions may include a hardware program flow monitor to generate an interrupt signal if a software program flow value does not match an incrementally updated hardware value when a processor executes a program flow check instruction. In an illustrative example, a program of instructions includes a number of program flow check instructions. While the processor executes the program instructions, the program flow monitor increments a hardware value in a register that is, for example, external to the processor. In one example routine, when the processor executes a program flow check instruction, a software value associated with that program flow check instruction is sent to the program flow monitor to be compared to the hardware value to determine if the program instructions have been executed in an expected sequence (e.g., according to an expected program flow). The program flow monitor interrupts the processor if the values do not correspond.

In some implementations, the hardware value may be incremented in response to a system clock, or it may be incremented by the processor upon executing certain instructions, such as a program flow check instruction, for example. In some examples, the hardware value may be maintained in a register external to the processor. In some examples, the program flow monitor may be implemented using hardware that is external to the processor. The program flow monitor may serve as an evaluation module configured to evaluate whether the hardware value corresponds to a software value.

In some implementations, the software values for each of the program flow check instructions may be determined by a compiler, linker, or the like, when the program is compiled into executable code. In some examples, the software values for each program flow check instruction may be stored in a look up table, or embedded as parameters directly in the program flow check instruction opcode.

In implementations that include at least one conditional branch instruction (e.g., jump, go to, or the like), a program flow instruction may overwrite the hardware value, for example, such that the hardware and software values may stay synchronized.

In some examples, the watchdog may be reset by a signal associated with an operation to send the software value to the program flow monitor.

Various implementations may provide one or more advantages. For example, an unauthorized attempt to disrupt a program flow may be made substantially more difficult. A program flow disruption may be detected by a hardware monitor external to the processor, thereby providing an independent check on program flow integrity. In some implementations, data security algorithms (e.g., erasing secure data from memory) may be triggered by a hardware interrupt signal from the program flow monitor.

Other features, objects, and advantages will be apparent from the description and drawings, and from the claims. The details of one or more implementations are set forth in the accompanying drawings and the description below.

DETAILED DESCRIPTION OF ILLUSTRATIVE EXAMPLES

Figure 1A:
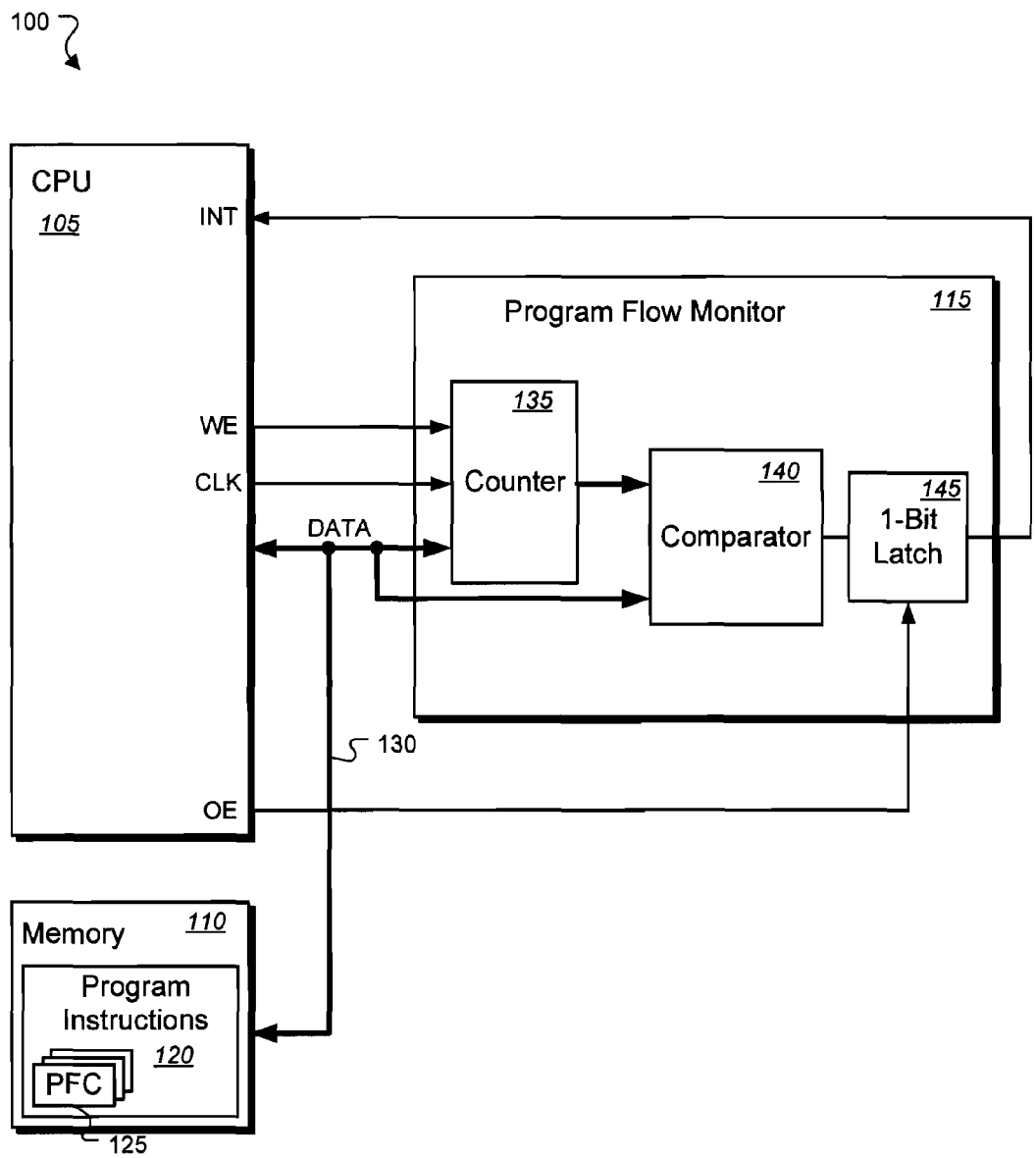
FIGS. 1A-1B are block diagrams illustrating exemplary systems capable of monitoring program flow.

FIG. 1A shows an exemplary system 100 capable of monitoring the integrity of a program flow for a processor executing a program of instructions. The system 100 includes a processor 105, a memory 110, and a program flow monitor (PFM) 115. The memory 110 stores a program of instructions 120 that has been modified to include a number of program flow check instructions (PFCs) 125. In normal operation, the processor 105 executes the program instructions 120 according to a program flow. Throughout the program 120, the processor 105 executes the PFCs 125 to determine whether the program flow has been disrupted. For example, when the processor executes one of the PFC instructions 125, the processor 105 transmits a software program flow value to the PFM 115. In the PFM 115, the software value is compared to a second value (e.g., a hardware program flow value). The second value is an expected (e.g., software) value. In various implementations, the second value may be incremented by signals that correspond to program execution. Some implementations may increment the second value after writes to the PFM 115 of the PFC instructions 125. If the software value does not match the expected value (e.g., in hardware), then the PFM 115 can initiate a pre-set response. In one implementation, the pre-set response can include the generation of a signal to interrupt the processor 105. In some examples, the PFM 115 may provide a hardware program flow integrity check upon each execution of one of the PFCs 125, and generate an interrupt signal if an incorrect program flow is detected.

In some exemplary applications, the program flow monitor 115 may operate to detect program flow disruptions that could, for example, compromise security. In some examples, the system 100 may be compromised if the program flow were to be disrupted such that, for example, instructions to protect secure data were skipped. Some program flow disruptions could bypass instructions that require the presence of a hardware key, a software key, or a password, for example, to access secure data or to perform a restricted operation. Upon detecting a program disruption, the program flow monitor 115 may generate an interrupt signal to the processor 105, which may result, for example, in resuming the proper program flow. Upon receiving the interrupt signal from the program flow monitor, the processor may, in some examples, reset the program flow and/or to take other protective actions.

From the memory 110, the processor 105 receives data, including the program instructions 120, via a data bus 130. For example, the memory 110 may be a non-volatile memory, such as a NAND flash memory, a NOR flash memory, a hard disk, or a read only memory (ROM).

In addition to storing the program 120, a portion of the memory space in the memory 110 may store secure data. For example, the secure data may include a password to access a bank account. In some implementations, some of the program instructions 120 may protect the secure data by, for example, requiring a secret data key or user credentials before allowing access to secure data.

The program flow monitor 115 operates to detect out of sequence flow of the program 120 when the processor 105 executes one of the PFC instructions 125. In one implementation, upon executing one of the PFC instructions 125, the processor 105 may transmit a write enable (WE) signal, a clock (CLK) signal, and/or an output enable (OE) signal to the PFM 115. The processor 105 may also transmit a software-generated value to the PFM 115. In response to the received signals, the PFM 115 compares the software value to a value stored in a register. If the values do not correspond, then, in one implementation, the PFM 115 generates an interrupt (INT) signal to interrupt the processor 105. Some example methods for generating the INT signal are described with reference to FIG. 3.

In one implementation, the PFM 115 includes a counter 135, a comparator 140, and a 1-bit latch 145. The counter 135 may store a counter value. In various examples, the counter 135 may increment or decrement the counter value when a predefined signal is detected. For example, the counter 135 may increment the counter value after the check data is written to the PFM 115. In some implementations, the counter 135 may include logic for presetting a value of the counter. This could be performed, for example, using a counter update register within the PFM 115. In the depicted example, the processor 105 may transmit the WE signal and a replacement value to the counter 135 to replace the counter value in the counter 135. For example, the counter 135 may replace the counter value with the data on the data bus 130 when the WE signal is active during a positive clock edge. In other implementations, the counter 135 may also receive a reset signal that, when received, may reset the counter value in the counter 135 to a predefined value (e.g., 00H).

The comparator 140 compares the counter value and the received data. The latch 145 may store a comparison result from the comparator 140. For example, the latch 145 may be an SR latch or a D Latch. In some examples, the comparator 140 may output a logic low voltage when the counter value and the received data match, and the comparator 140 may output a logic high voltage when the counter value and the received data do not match.

In the depicted example, the latch 145 also receives the OE signal from the processor 105. The processor 105 may use the OE signal to enable or disable an output of the latch 145. When the output is enabled, the latch 145 transmits the stored comparison result to the processor 105. The latch 145 may only latch the comparison result when the OE signal is received. In the event of a mismatch of the values (e.g., the hardware and software values), the latch 145 outputs a signal that couples to an interrupt (INT) input of the processor 105.

In some examples, the processor 105 may generate a software value associated with the PFC 125 to be transmitted to the PFM 115. For example, the software value may be generated by a compiler or a loader. In some examples, the compiler may generate the software value of the PFC 125 by, for example, determining an expected hardware value associated with the PFC 125. For example, the compiler may predetermine expected values for the counter 135 as the program instructions 120 are executed in a predetermined sequence.

Each of the software values may be associated with a corresponding PFC instruction in various ways. In one implementation, a software value may be stored in an opcode of the PFC 125 (e.g., as a parameter in assembly code or machine code). In another implementation, the opcode of the PFC 125 may include a pointer to an entry of a look-up table containing the software value. After the software value is retrieved, the processor 105 transmits the retrieved software value to the PFM 115. In some examples, the processor may cause the software value to be supplied to the PFM 115 without the software value being passed to or from the processor.

Using the software value associated with the PFC that is currently or most recently processed (e.g., executed), the PFM 115 may operate to determine whether the program flow is correct. For example, the program flow is not correct if the comparator 140 determines that the received software value does not correspond to the counter value. When the counter value and the received software value do not match, the PFM 115 may transmit the mismatch signal to the processor 105 to generate an interrupt signal to the processor 105. In various implementations, the processor 105 may perform various interrupt routines. Some examples of methods for causing interrupt routines in response to execution of a PFC instruction are described with reference to FIG. 2.

Compilers may use various methods to generate a software value for each PFC placed into a program or set of instructions. In some examples, the counter 135 increments the counter value every clock cycle. Then, the compiler may generate each software value associated with the PFC 125 by determining a number of clock cycles to be executed by the processor 105 after a nearest preceding PFC in that branch of sequential instructions. In some programs that have multiple branches of sequentially executed instructions, the compiler may determine a base counter value (e.g., initialization value) at or near the beginning of each branch. The expected count values for PFCs instructions in that branch may be based on a count relative to the base counter value for that branch. At run time, before executing PFC instructions in a branch, the base count value for that branch may be loaded into the counter 135 in the PFM 115. Accordingly, the counter value in the counter 135 may be maintained synchronized when executing programs that contain multiple branches of sequential instructions.

In some implementations, the counter 135 increments the counter value each time a PFC instruction is executed. In such implementations, the compiler may generate each software value associated with the PFC 125 by incrementing the software value relative to an immediately preceding PFC instruction, if any, in that branch. After a program flow disruption, the check instruction that should be executed next may be skipped, or will be executed after an unexpected number of clock cycles, for example. As such, the hardware counter value will likely not match the software value associated when the next PFC instruction is executed. In response to such a mismatch, the PFM 115 will generate an interrupt.

For each program flow branch, the processor 105 may re-synchronize the counter value with the appropriate value for that branch. For example, the processor 105 may transmit the WE signal and a synchronized replacement value to the PFM 115 after each branch instruction is executed. When the counter 135 receives the WE signal and the replacement value, the counter 135 may store the received replacement value and discard the presently stored counter value. The processor 105 may retrieve the replacement value from the program instruction 120 after executing the branch instruction. For example, a first opcode of each branch may include a pointer to the associated replacement value, which may be stored in a lookup table entry, for example.

Figure 1B:
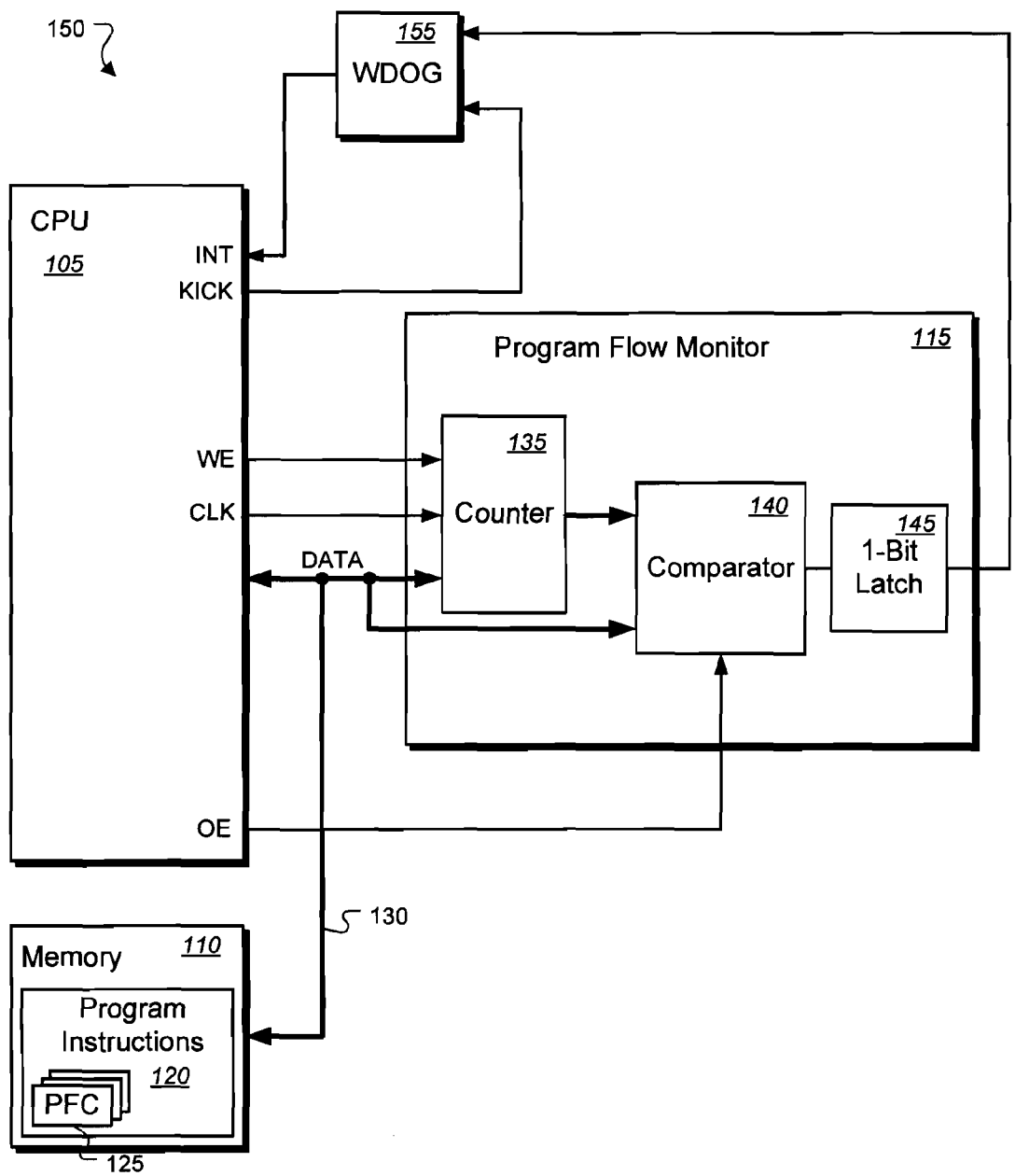

In some implementations, the PFM 115 may be used in combination with other security mechanisms to monitor and/or correct program flow. For example, the PFM 115 may be used in combination with a watchdog timer or software only checks. As shown in FIG. 1B, the system 150 includes the PFM 115 and a watchdog timer 155 to detect incorrect program flows. In the depicted example, the processor 105 receives the INT signal from the watchdog timer 155 when incorrect program flow is detected. In some examples, the INT signal generated by the watchdog timer 155 may trigger interrupt handling routines in the processor 105 to protect secure data from being accessed.

In the depicted example, the processor 105 transmits a reset (e.g., sometimes referred to as a kick signal) signal to the watchdog timer 155. In some implementations, the kick signal may be responsive to one or more of the WE, CLK, DATA, and/or OE signals supplied to the PFM 115. In such examples, the watchdog 155 may not generate an INT signal as long as the processor 105 interacts with the PFM 115 within a reset period of the watchdog 155. Generally, the watchdog 155 may transmit the INT signal to the processor 105 if the kick signal is not received for a predefined period of time (e.g., 10 ms). In various implementations, the INT signal may trigger the processor 105 to handle an error condition. For example, the INT signal may trigger the processor 105 to restart the system 150. In another example, the INT signal may trigger the processor 105 to change operation to a safe mode in which secure data cannot be read from the memory 110.

As shown, the watchdog 155 is implemented as external hardware. In other implementations, the watchdog 155 may be implemented as part of the processor 105. In other implementations, the watchdog 155 and the PFM 115 may be integrated into a module (e.g., an ASIC) that is configured to provide flexible error detection capabilities for the processor 105.

In some implementations, the watchdog 155 also receives a signal from the PFM 115. In some examples, the control signal can disable the watchdog 155 from receiving the kick signal. The PFM 115 generates the signal based on the comparison result generated by the comparator 140. In the depicted example, the comparator 140 may compare the received software value and the counter value when the OE signal is received. The OE signal may disable the output of the comparator 140 so that the comparison result of the comparator 140 is not stored in the latch 145. Based on the comparison result, the PFM 115 may enable the watchdog 155 if the received software value does not correspond to the hardware counter value, and disable the watchdog 155 if the received software value corresponds to the counter value.

In various examples, the systems or methods may be advantageously used in applications that include, but are not limited to, portable or desktop computer systems, servers, general purpose computers, equipment for industrial, scientific, or medical applications (e.g., programmable logic controllers, test and measurement systems, patient bed side monitors, and the like), telecommunication equipment, automated teller machines, smart cards, or handheld mobile devices (e.g., cell phones, portable digital assistants). An illustrative example may be implemented in a processor-based device that stores secure data and/or provides restricted functionality.

In some implementations, an output of the counter 135 may be generated based on the counter value to improve data security. By having different implementations of the counter, the level of security may be increased. In some examples, the counter 135 may include a simple adder (e.g., up or down counter, shift register), or more complex logic, such as an arithmetic logic unit (ALU). In some examples, the counter 135 may include a processor running a CRC (cyclical redundancy check) code. For example, the counter 135 may include additional logic or hardware to generate the counter output value. For example, the adder or the ALU that may perform logic or arithmetic operations to generate the counter output value. The ALU may generate an output to the comparator 140 by, for example, multiplying the counter value by a number (e.g., three). In other examples, the counter 135 may include complex logic that includes combinational and/or sequential logic (e.g., a decoder, an encoder, or state machines) to generate an output to the comparator 140 based on the counter value.

In other implementations, the counter 135 may be a second processor that executes software to generate the stored counter output value. For example, the counter 135 may execute a cyclic redundancy check (CRC) to produce a checksum based on the stored counter value. In various examples, such a second processor may be implemented, in whole or in part, with synchronous and/or combinational logic circuits and/or analog circuits, for example, which may be discrete, integrated, or a combination thereof.

In some implementations, one or more of the PFCs 125 may be inserted into a program of instructions automatically by the compiler and/or manually by a software programmer. For example, the compiler may insert the PFCs 125 into the program instructions 120 during the compilation process. In another example, the programmer may manually specify at one or more locations where the PFCs 125 are to be inserted in the program instructions 120 using, for example, a predetermined syntax. In some examples, a programmer may manually add or remove PFCs before and/or after a compiler automatically inserts PFCs into the program.

In some implementations, the automated insertion of the PFCs 125 may be selectable. For example, the compiler may include an option to select a level of protection for individual software in the systems 100, 150. If a program is selected to have higher level of protection, the PFCs 125 may be inserted more frequently into the program, for example. If a program is selected to have a low level of protection, for example, relatively fewer of the PFCs 125 may be inserted into the program. For example, a PFC may be inserted for every 25 instructions for a high level of security, or inserted every 100 instructions for a low level of security. In various examples, PFCs may be automatically inserted at each conditional branch instruction, and may further include a reset (e.g., initialization) value for writing to the counter 135 in the PFM 115.

Figure 2:
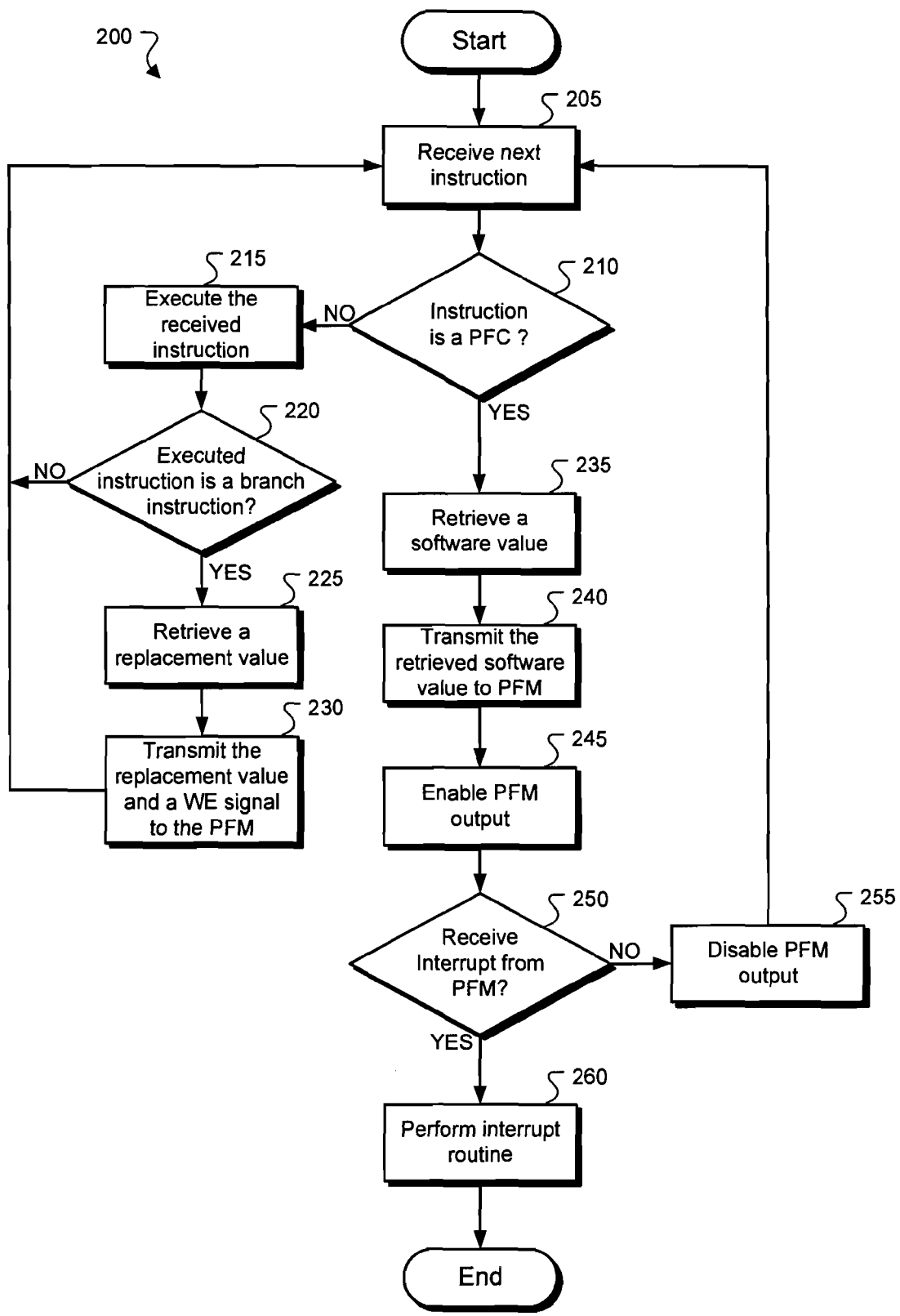
FIG. 2 is a flow diagram illustrating an exemplary method for executing a program with program flow check instructions.

FIG. 2 shows a flow chart that illustrates an exemplary method 200 of operations for monitoring the program flow in a CPU (e.g., the processor 105). The method 200 includes operations that may be performed generally by a processor (e.g., the processor 105). The operations may be performed under the control, supervision, and/or monitoring of a computer system (e.g., the system 100 or the system 150). Operations may also be supplemented or augmented by other processing and/or control elements that may be incorporated by an interface (e.g., the data bus 130 or other communication interfaces). Some or all of the operations may be performed by one or more processors executing instructions tangibly embodied in a signal. The processing may be implemented using analog and/or digital hardware or techniques, either alone or in cooperation with one or more processors executing instructions.

The method 200 begins at step 205 when an instruction to be processed next is identified (e.g., received). For example, the processor 105 may receive the program instructions 120 from the memory 110 during an instruction fetch operation. In step 210, it is determined whether the received instruction is a PFC instruction. For example, the processor 105 may use an instruction translation table and determine that the received instruction is the PFC 125. If it is determined that the received instruction is not a PFC, then the received instruction is executed in step 215. Next, in step 220, it is determined whether the executed instruction is a branch instruction (e.g. go to, jump, or the like). If it is determined that the executed instruction is not a branch instruction, then the step 205 is repeated. If it is determined that the executed instruction is a branch instruction, then, in step 225, a replacement value is identified (e.g., retrieved). For example, the processor 105 may retrieve the replacement value from a lookup table entry. In step 230, the replacement value and a write enable (WE) signal are generated and stored in a counter (e.g., the counter 135) of a PFM (e.g., the PFM 115), and the step 205 is repeated. For example, the processor 105 may transmit the WE signal and the replacement value to the counter 135 of the PFM 115 to update the counter value.

If, in step 210, it is determined that the instruction is a PFC, then a software value is retrieved in step 235. For example, the processor 105 may retrieve the software value from the opcode of the PFC 125 or from a lookup table. The retrieved software value is, in step 240, transmitted to the PFM. For example, the processor 105 may transmit the retrieved software value to the PFM 115 via the data bus 130.

Next, a PFM output is enabled in step 245. For example, the processor 105 may enable the PFM output by transmitting the OE signal to the latch 145. In another example, the processor 105 may enable the PFM output by transmitting the OE signal to the comparator 140. It is determined, in step 250, whether an interrupt is received from the PFM. For example, the processor 105 may determine whether a voltage level of the INT signal is above a predetermined threshold. If, for example, a logic high voltage is received from the INT signal, then the processor 105 may determine that an interrupt is received from the PFM 115. If it is determined that no interrupt is received from the PFM, then the PFM output is disabled in step 255 and the step 205 is repeated. If it is determined that the interrupt is received from the PFM, then, in step 260, an interrupt routine is performed, and the method 200 ends.

Figure 3:
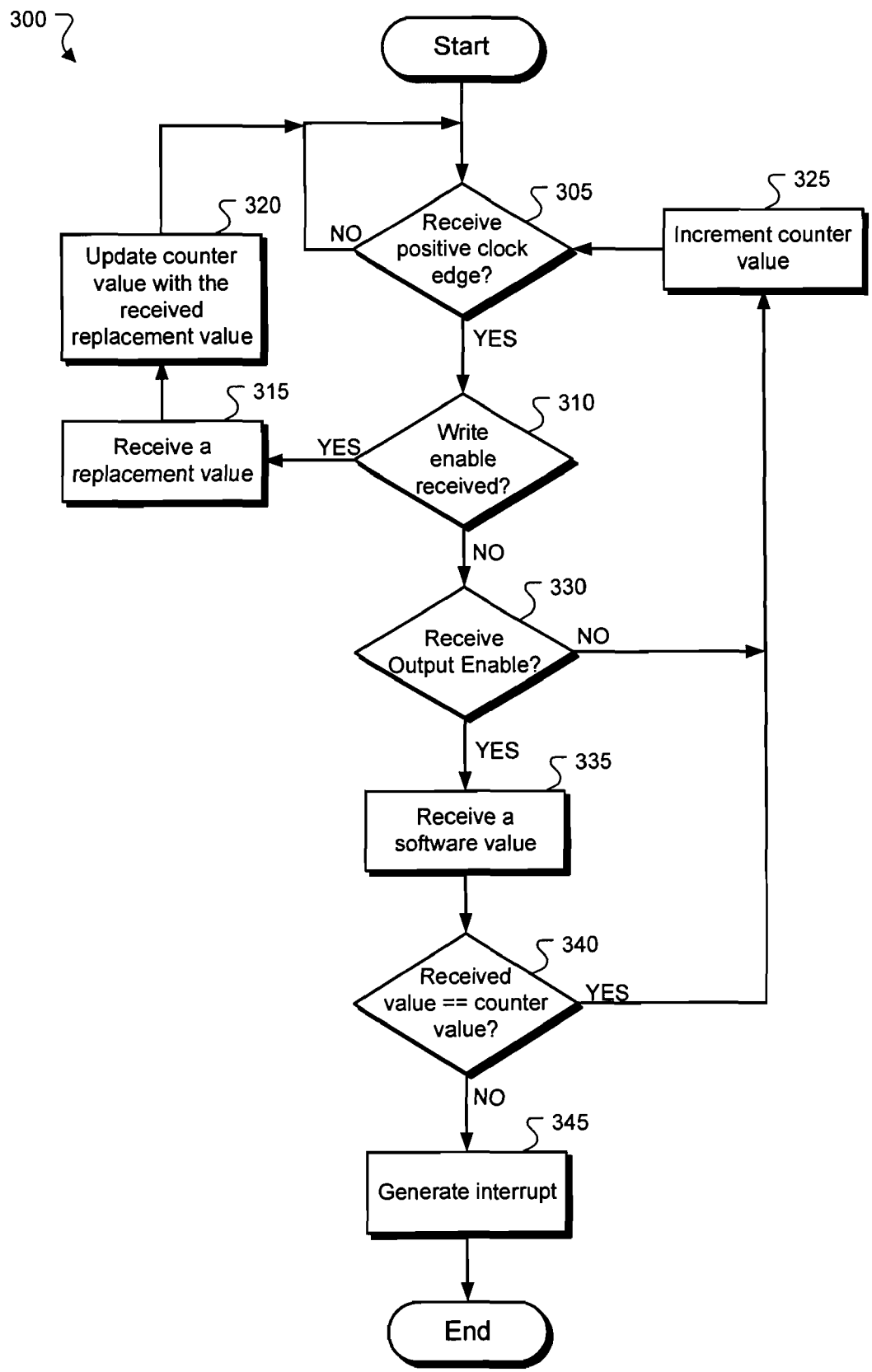
FIG. 3 is a flow diagram illustrating an exemplary method for operating a program flow monitor to detect program flow errors.

FIG. 3 shows a flow chart that illustrates an exemplary method 300 for monitoring the program flow of a program being executed in a CPU (e.g., the processor 105). The method 300 includes operations that may be performed generally by a PFM (e.g., the PFM 115). The operations may be performed under the control, supervision, and/or monitoring of the processor. Operations may also be supplemented or augmented by other processing and/or control elements that may be incorporated by an interface (e.g., the data bus 130 or other communication interfaces).

The method 300 begins at step 305 when the PFM determines whether a relevant portion of signal (e.g., a positive clock edge) is received. For example, the PFM 115 may monitor the CLK signal for a positive edge. If it is determined that, for example, the positive clock edge is not received, then the step 305 is repeated. If it is determined that, for example, the positive clock edge is received, then, in step 310, it is determined whether a write enable is received. For example, the PFM 115 may check whether the WE signal is received from the processor 105. If it is determined that the write enable is received, then a replacement value is received in step 315. For example, the PFM 115 may receive the replacement value from the processor 105 via the data bus 130. Next, a counter value is, in step 320, updated with the received replacement value and the step 305 is repeated. For example, the counter 135 may use the received replacement value from the processor 105 to update the stored counter value.

In step 310, if it is determined that the write enable is not received, then it is determined whether an output enable is received in step 330. For example, the PFM 115 may determine whether the OE signal is received from the processor 105.

If the OE signal is not received, then, in step 325, a counter value is updated (e.g., incremented), and the step 305 is repeated. For example, the counter 135 may increment the counter value. If the OE signal is received, then a software value, in step 335, is received. For example, the PFM 115 may receive a software value from the processor 105 via the data bus 130. The software value may be associated with a PFC instruction that has been executed by the processor. Next, it is determined, in step 340, whether the received software value corresponds to the stored counter value. For example, the PFM 115 may use the comparator 140 to compare the received software value and the counter value. If it is determined that the received software value corresponds to the stored counter value, then the step 325 is repeated. If it is determined that the received software value does not correspond to the stored counter value, then an interrupt is generated in step 345, and the method 300 ends. For example, when the received software value is not equal to the stored counter value, then the comparator 140 may generate a signal to the 1-bit latch 145 to generate the INT signal.

Although examples of a system, which may be portable, have been described with reference to the above figures, other implementations may be deployed in other applications, such as other circuit applications, computing applications, network applications, and the like.

In some examples, the processor may, upon executing a program flow check instruction, perform operations that include sending a predetermined value to the program flow monitor. The predetermined value may be associated with the instruction at compile time, for example, and may represent an expected change in the program flow relative to a previous value of the program flow when a most recent program flow check instruction was performed. In some embodiments, the program flow monitor may add (or subtract) the predetermined value from a cumulative count, for example, maintained in a counter of the program flow monitor. In some embodiments, the program flow monitor may maintain a value that represents a count of the number of transitions of a signal (e.g., system clock) that have occurred since a most recent program flow check instruction or an initialization of the counter within a branch of sequentially executable instructions.

Although particular features of example architectures have been described, other features may be incorporated to improve performance. For example, the interrupt signal generated by the PFM 115 may be sent to an interrupt controller or other interrupt processing device external to the processor 105.

The processor 105 may execute different routines to protect the secure data when an incorrect program flow is detected. For example, the processor 105 may erase all secure data when the interrupt is received. In another example, the processor 105 may reset the system 100 or 150 to prevent the secure data from being accessed. In another example, the processor 105 may generate a message to notify an administrator about the incorrect program flow. In another example, the processor 105 may perform a combination of the above to protect the secure data.

In addition to, or instead of, directly comparing a hardware and a software value to detect program flow disruptions, some implementations may evaluate hardware and/or software values as parameter inputs to one or more digital and/or analog functions. The computed results of such functions may be compared to an expected value or threshold to detect program flow disruption. Exemplary functions may include, but are not limited to, hash functions, bit shifting, combinational logic, mathematical operations (e.g., multiplication, subtraction, division, addition), and/or combinations of these or other operations.

Various implementations may include digital and/or analog circuitry, computer hardware, firmware, software, or combinations thereof. Some systems may communicate using suitable communication methods, equipment, and techniques. The components of the system may exchange information by any form or medium of analog or digital data communication.

In one aspect, an example system includes a register operable to store a first data value, and an evaluation module to evaluate whether the first data value corresponds to a second data value. The system also includes a processor to execute a set of instructions to be performed in a predetermined sequence. Executing the sequence of instructions causes operations to be performed. One of the operations involves processing an instruction in the set of instructions to determine whether the instruction is being executed according to the predetermined sequence. Another one of the operations involves sending the second data value to the evaluation module. This second data value is associated with the processed instruction and has a value that represents the processed instruction's place in the predetermined sequence. The system further includes an update module to update the first data value in response to an update signal that is associated with the processor's execution of the instructions according to the predetermined sequence. Finally, the system includes an output module to generate an output signal if the second value does not correspond to the first data value.

In some embodiments of the system, the set of instructions includes a branch of sequential instructions in a program of instructions. The program of instructions may include at least one additional branch of sequential instructions. The system may further include a counter that comprises the register and the update module.

In some applications, the system of claim includes a smart card that contains the processor and the counter. In some examples, the update signal corresponds to one or more instruction cycles of the processor, or the update signal corresponds to each execution of one of the instructions to determine whether the instruction is being executed according to the predetermined sequence.

In some examples, a value of the predetermined sequence is determined upon compiling the set of instructions. The system may include a watchdog module to generate the output signal if the update module does not receive the update signal for at least a predetermined length of time. The processor may include an interrupt input coupled to receive the output signal. The system may include a data bus that is operable to transport the second data value from the processor to the evaluation module. The evaluation module may be operable to determine if the first value matches the second value.

In another aspect, an example method includes a number of operations. In a first operation, in a device having a processor that executes a program of instructions that includes one or more program flow verification instructions, the method includes updating a program flow value as the processor executes a program instruction. In another operation, upon execution by the processor of a program flow verification instruction, the method includes determining whether a verification value associated with the program flow verification instruction corresponds to the updated program flow value. If the verification value does not correspond to the updated program flow value, the method includes initiating a protective action. The verification value is a compiler-determined value that represents an expected order of execution of the program flow verification instruction relative to other instructions.

In various implementations of the method, the method may further include an operation of initializing the program flow value after beginning to execute a new branch of sequential instructions. Initiating a protective action may include interrupting the processor.

In another aspect, an example system includes a processor configured to execute program instructions that have one or more program flow verification instructions. Each program flow verification instruction is associated with a verification value that represents a predetermined order of execution of the program flow verification instructions relative to other program instructions. The system further includes means for verifying program flow configured to determine, in response to execution by the processor of a program flow verification instruction, whether a verification value associated with the executed program flow verification instruction corresponds to an expected program flow value.

In some implementations of the system, the system may include means for interrupting the processor upon determining that the verification value does not correspond to the expected program flow value. The verifying means may further include a counter operable to store the program flow value. The counter may be operable to update the expected program flow value as the processor executes program instructions. Initiating the protective measure may include generating a signal to interrupt the processor.

In some examples, the verification value may be a software generated value, such as a software value associated with the PFC that is currently or most recently processed (e.g., executed).

A number of implementations have been described. Nevertheless, it will be understood that various modifications may be made. For example, advantageous results may be achieved if the disclosed operations were performed in a different sequence, if components in the disclosed systems were combined in a different manner, or if the components were replaced or supplemented by other components. Some disclosed functions and processes (including algorithms) may be performed in hardware, software, or a combination thereof, and some implementations may be performed on modules or hardware not identical to those described. Accordingly, other implementations are within the scope of the following claims.

What is claimed is:

1. A system comprising:
   a register operable to store a first data value that represents an expected place of an instruction in a predetermined sequence of instructions;
   a processor to execute a set of instructions to be performed in the predetermined sequence, wherein executing the sequence of instructions causes operations to be performed, the operations comprising:
   processing an instruction in the set of instructions to determine whether the instruction is being executed according to the predetermined sequence; and
   setting a second data value to a value that represents the processed instruction's place in the predetermined sequence;
   an evaluation module to evaluate whether the first data value corresponds to the second data value;
   an update module to update the first data value in response to an update signal associated with the processor's execution of the instructions according to the predetermined sequence if the first data value corresponds to the second data value;
   an output module to generate an output signal if the second data value does not correspond to the first data value;
   a counter that includes the register and the update module; and
   a smart card that includes the processor and the counter.

2. The system of claim 1, wherein the set of instructions comprises a branch of sequential instructions in a program of instructions.

3. The system of claim 2, wherein the program of instructions comprises at least one additional branch of sequential instructions.

4. The system of claim 2, wherein the operations further comprise initializing the second data value after beginning to execute the branch of sequential instructions.

5. The system of claim 1, wherein the update signal corresponds to one or more instruction cycles of the processor.

6. The system of claim 1, wherein the update signal corresponds to each execution of one of the instructions to determine whether the instruction is being executed according to the predetermined sequence.

7. The system of claim 1, wherein a value of the predetermined sequence is determined upon compiling the set of instructions.

8. The system of claim 1, further comprising a watchdog module to generate the output signal if the update module does not receive the update signal for at least a predetermined length of time.

9. The system of claim 1, wherein the processor comprises an interrupt input coupled to receive the output signal.

10. The system of claim 1, further comprising a data bus that is operable to transport the second data value from the processor to the evaluation module.

11. The system of claim 1, wherein the evaluation module is operable to determine if the first value matches the second value.

12. The system of claim 1, wherein the output signal initiates a protective action.

13. The system of claim 12, wherein the protective action includes interrupting the processor.

* * * * *